United States Patent [19]

Mikes

[11] Patent Number: 4,579,499

[45] Date of Patent: Apr. 1, 1986

[54] STORAGE DEVICE WITH RADIATED COMMAND SIGNAL

[76] Inventor: Tivadar Mikes, Universitätsstrasse 10, 1090 Vienna, Austria

[21] Appl. No.: 507,713

[22] Filed: Jun. 23, 1983

[30] Foreign Application Priority Data

Jul. 6, 1982 [AT] Austria ............................... 2621/82

[51] Int. Cl.[4] ............................................. B65G 1/08
[52] U.S. Cl. .................... 414/273; 414/276; 414/280; 221/290
[58] Field of Search ............... 414/267, 273, 276, 277, 414/278, 280; 221/290, 293; 194/10

[56] References Cited

U.S. PATENT DOCUMENTS

| 3,240,365 | 3/1966 | King | 414/273 |
|---|---|---|---|
| 3,247,929 | 4/1966 | Langley | 414/276 X |
| 3,746,130 | 7/1973 | Bullas | 414/134 X |
| 3,958,102 | 5/1976 | Burt | 414/273 X |
| 4,251,177 | 2/1981 | Neuhaeusser et al. | 414/276 |
| 4,307,988 | 12/1981 | Page et al. | 414/276 |

FOREIGN PATENT DOCUMENTS

| 2329394 | 12/1973 | Fed. Rep. of Germany | 414/277 |
|---|---|---|---|
| 2835404 | 2/1980 | Fed. Rep. of Germany | . |
| 8301769 | 5/1983 | PCT Int'l Appl. | 414/280 |

*Primary Examiner*—Joseph E. Valenza
*Assistant Examiner*—Ken Muncy
*Attorney, Agent, or Firm*—Martin A. Farber

[57] ABSTRACT

A storage device for a number of different articles which are to be stored includes containers which are placed in a receiving frame on resting surfaces and acted on in an ejection direction which is perpendicular to the lengthwise direction of the resting surfaces. The containers are held in the receiving frame by a hold-back device which can be overcome by action of a release device, each container having, associated with it, a release device and a receiving and code recognition device with which a given code is associated.

8 Claims, 10 Drawing Figures

STORAGE DEVICE WITH RADIATED COMMAND SIGNAL

BACKGROUND OF THE INVENTION

The present invention relates to a storage device for a plurality of different articles to be stored, particularly packages of medicines, with which loose containers each of which can be loaded with one or a small number of different articles to be stored are held in displaceable manner on resting surfaces in a receiving frame, the containers being acted on in ejection direction and being held on the resting surface by at least one engageable hold-back device.

Such storage devices have been known for a long time. These devices generally have a row of flat resting surfaces whose principal axes are horizontal and on which containers can be placed. In order to be able to find the desired containers most easily, the resting places of the individual containers are designated in accordance with a coordinate system, the containers being generally also marked with the coordinates of their resting places.

Despite these organizational measures, it is frequently difficult to find the desired container or article rapidly in large storage devices of this kind.

Storage devices are also known in which the receiving frame is subdivided into individual compartments which are closed by a flap. These flaps are provided with a retainer which can be disengaged via a release device which is actuatable by means of a given signal. In this case, while it is possible to open the flap of a given compartment by giving the corresponding signal in connection with which also an optical indication can be activated, nevertheless the rigid association of an article to be stored with a given compartment constitutes a disadvantage.

Furthermore, it is also not possible—or only possible with great difficulty—to remove the stored articles by means of automatically controlled devices and bring them to a delivery station.

Furthermore, from West German OS No. 28 35 404 there is known a device of the aforementioned type in which a disengagable hole-back device is provided for a large number of containers arranged on a resting surface. In this case each hold-back device has a given hold associated with it, a row of containers being ejectable in the longitudinal direction of the corresponding surface by the release of a hold-back device.

The disadvantage of this known solution is that it is not possible to call for a given specific container from the resting surface. This, however, would be desirable in many cases, particularly in storage devices for a large number of different articles only relatively small numbers of which are called for simultaneously, as is true, for instance, in pharmacies.

SUMMARY OF THE INVENTION

The object of the present invention is to propose a storage device of the aforementioned type which, on the one hand, makes it possible easily and rapidly to find the individual stored articles and the design of which also permits removal of the stored articles by an automatically controlled device.

This result is obtained, in accordance with the invention, in the manner that each container is held individually in the receiving frame by a hold-back device which can be disengaged or overcome by means of a release device and that the direction of ejection of each container is perpendicular to the lengthwise direction of the resting surfaces which receive the containers one alongside the other, a given code being associated in known manner with each container and a known receiving and code recognition device being provided for each container, which device, upon the arrival of the code associated with the the container, actuates the release device of the hold-back device holding the corresponding containers.

In this way, assurance is had that when the corresponding signal is given the container in question is ejected by itself from the receiving frame, the sequence in which individual containers are called for being any desired. Furthermore, there is the advantage that each container can be inserted into the receiving frame at any desired place and, in particular, at the end of the row of stacks in the receiving frame. As a result of the code, which is specific to each container, the corresponding recognition is possible regardless of the place in the receiving frame where the container is located.

Furthermore, due to the measures proposed, there is also created the possibility of automating the filling of the containers in simple manner. Thus, it is possible to move the coded articles to be stored via a filling hopper and conveyor means past a code recognition device and introduce them into the containers which are also moved past a code recognition device, the two code recognition devices being connected to a computer. In this way the containers can be automatically filled in very simple fashion, despite which one maintains an overall view of the filling of the containers. In smaller systems of this kind the receiving and code recognition device could be arranged in the receiving frame, the code recognition device comparing the code printed on the corresponding container with the code which can be noted from the incoming signals.

In accordance with the invention, each container may be provided with, a receiving and code recognition device including an antenna (radiation receiver) and a release device arranged behind the latter, the storage device including an antenna (radiating means) which is provided for radiating the signals corresponding to the code of one container each and/or the code-producing unit associated with the antenna being controlled preferably by an input and processing unit, which may be formed by a computer which is connected to input stations, a data storage and a printer. In this manner, it is possible, in particularly simple fashion, rapidly to find the desired stored articles and cumbersome wiring is unnecessary. Furthermore, it is possible at the same time to evaluate the storage movements by means of the computer.

In one preferred embodiment of the invention, the hold-back device is formed of a hook which, when the container is pushed fully into the receiving frame, engages behind one edge of the receiving frame, the hook being connected with the armature of an electromagnet which forms the release device and being urged by a spring towards its stop position. In this way it is unnecessary to maintain relatively precise positions for the containers and the containers can be inserted at any desired place into the receiving frame and pushed out from it again.

In one storage device according to the invention having a receiving frame with resting surfaces for the containers which are inclined to the horizontal and conveyor belt arranged in front of the lower edges of each resting surface, it is possible, in accordance with another feature of the invention, to provide at least one vertical conveyor which is arranged laterally of the resting surfaces or conveyor belts and for further devices to be provided to push containers from the vertical conveyor onto a resting surface.

In this way, automatic filling of the receiving frame and automatic removal of the containers is possible even in the case of larger receiving frames. The containers can in this connection be brought via the vertical conveyor to the height of a given resting surface and then pushed onto said surface while, on the other hand, a container which has been pushed out of the receiving frame or pushed off from a resting surface is brought via a conveyor belt to a vertical conveyor and by the latter to a delivery station.

In this connection, it is advisable to provide in the region of each resting surface a conveyor device which extends over substantially the entire length of the resting surface and acts on a container present on the resting surface, as a result of which the resting space within the receiving frame can be optimally utilized.

Another embodiment of a storage device in accordance with the invention is characterized by the fact that the receiving frame has a helically extending resting surface which furthermore slopes downwards in transverse direction towards a chute which extends parallel to it. In this way, particularly simple conditions with respect to the operation of the device are obtained. Thus the containers can be simply fed from above onto the resting surface and then slide down by themselves upon the removal of a container. Upon the actuation of a release device, the container in question slides onto the chute and then down on the latter to the delivery point.

One embodiment which is of very simple construction is characterized by the fact that the hold-back device is formed by a bead which extends along the front edge of the resting surface and that the release device is formed by a ram which is under spring action, the ram being adapted to be held in its tensioned position by a locking pawl which can be unlocked via an electromagnet, an impact wall being arranged in the vicinity of the rear edge of the resting surface, it being possible to place the containers at any desired places on the resting surfaces.

In order to permit easy movement of the containers in two directions perpendicular to each other, it is advantageous for the containers to be supported on ball casters.

BRIEF DESCRIPTION OF THE DRAWINGS

The invention will now be explained in further detail with reference to the drawing.

DETAILED DESCRIPTION OF THE PREFERRED EMBODIMENTS

Figure 1:
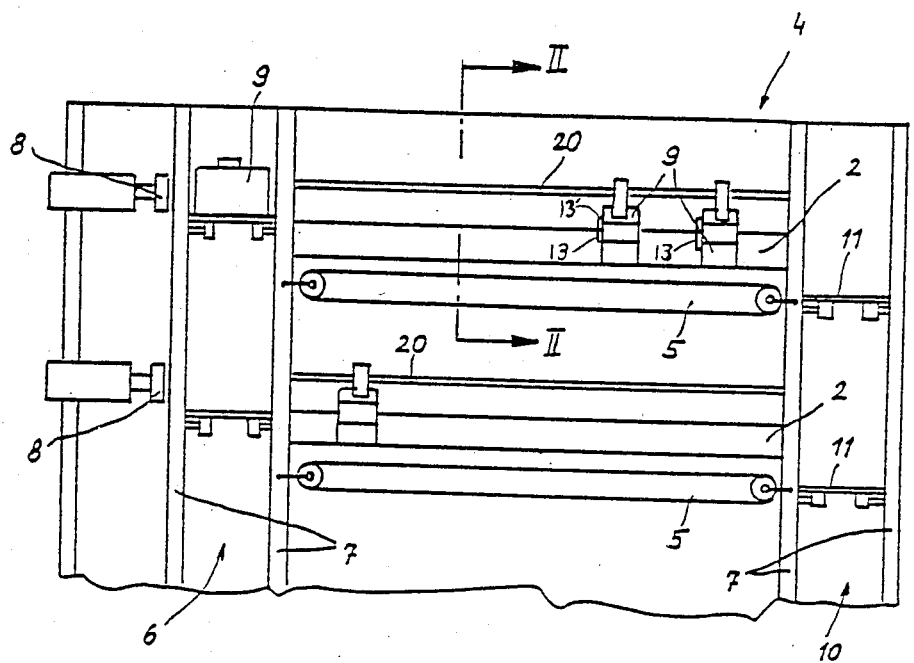
FIG. 1 is a view of one embodiment of a storage device according to the invention.
Figure 2:
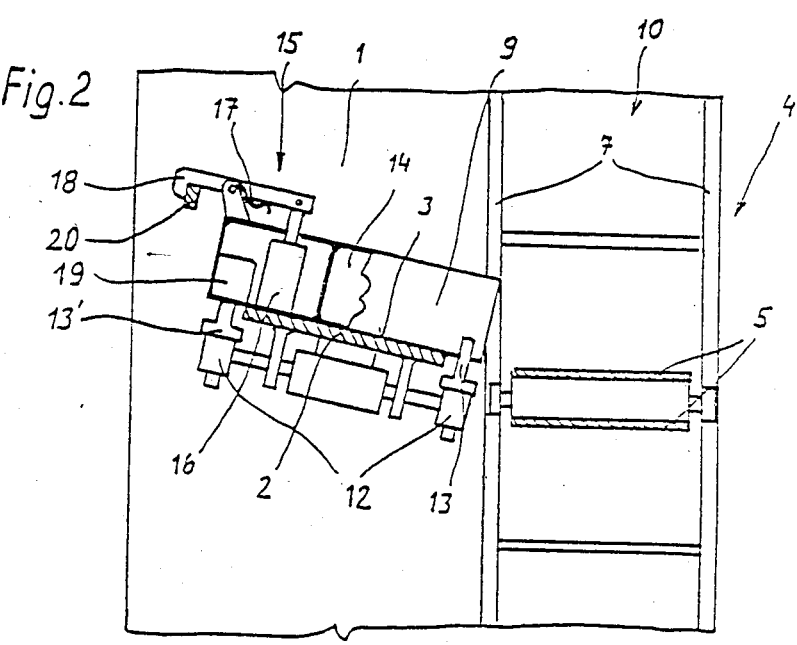
FIG. 2 is a cross section along the line II—II of FIG. 1.

In the storage device shown in FIGS. 1 and 2, there is provided a receiving frame 4 in which, between two side walls 1, there are arranged shelves 2 whose resting surfaces 3 extend transversely and are inclined forwards over the depth of the receiving frame 4. In front of each shelf 2 or each resting surface 3 there is arranged a horizontally extending conveyor belt 5 which travels endlessly over drive and guide rollers.

On the left hand side of the receiving frame 4 there is a vertical conveyor 6 which slides in guides 7. Furthermore, in the region of the height of the upper edges of the resting surfaces 3 there are arranged push rams 8 by which containers 9 can be pushed from the vertical conveyor 6 onto a resting surface 3.

On the right hand side of the receiving frame another vertical conveyor 10 is arranged in the region of the conveyor belts 5 onto the platforms 11 of which vertical conveyor, said platforms sliding in guides 7, the containers 9 can be pushed from a vertical conveyor belt.

As can be noted from FIG. 2, below the shelves 2 there is arranged a rotating chain conveyor 12 or the like which extends via fingers 13, 13' beyond the front and rear longitudinal edges respectively of the shelf 2. In this way, it is possible to push together the containers 9 which protrude on both sides beyond the resting surface 3 in the direction, for instance, towards the right vertical conveyor 10, in which connection, when a given tractive force is exceeded, the drive of the chain conveyor is stopped, the fingers being connected with the chains in a manner tiltable in one direction in order not to carry the containers 9 along in the opposite direction.

Figure 6:
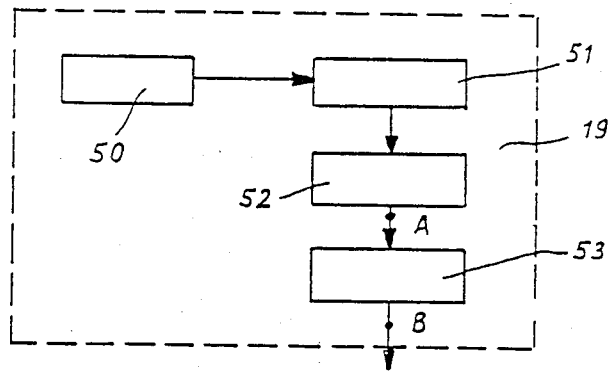
FIG. 6 diagramatically shows the receiving and evaluation device for a container.

As can furthermore be noted from FIG. 2, the containers 9 have, in addition to the loading space 14, also a compartment within which there is arranged an electromagnet 16 to whose armature there is pivoted a hook 18 which is acted on by the spring 17 and, together with the electromagnet, forms the release device 15. Within this compartment there are also arranged a receiving and code-recognition device 19 including an antenna 50 (FIG. 6).

The hook 18 engages behind a bar 20, arranged above each resting surface 3 and extending parallel thereto, and thus holds the container 9 on the resting surface 3, from which it would otherwise slide off due to the inclination of said surface.

With suitably insulated mounting of the bar 20 in the side walls 1, the supplying of the current to the receiving and code recognition device as well as to the release device of each container 9 can take place via these bars 20, which may be provided with two conductive current paths which are insulated from each other. The current can be removed from said paths via corresponding contact paths which are arranged in the hook 18 of each container 9. Of course, it is also possible to arrange batteries within the containers 9 in order to supply them with current.

If a signal now arrives at the receiving and code recognition device 19 of a container 9 and said signal is recognized as corresponding to the code of said container, the electromagnet 16 is energized and brings the hook 18 out of engagement with the bar 20. As a result, the container 9 slides onto the conveyor belt 5 and passes to the vertical conveyor 10, which brings it to a delivery station.

The containers 9 remaining on that resting surface can then be pushed together by the chain conveyor 12.

For the filling of the receiving frame 4, the containers 9 can be brought by the vertical conveyor 6 to the height of the desired resting surface 3 and then pushed onto it by the push-ram 8, the hook 18 engaging with the bar 20.

The control of the storage device will be explained with reference to FIGS. 3 to 8.

Figure 3:
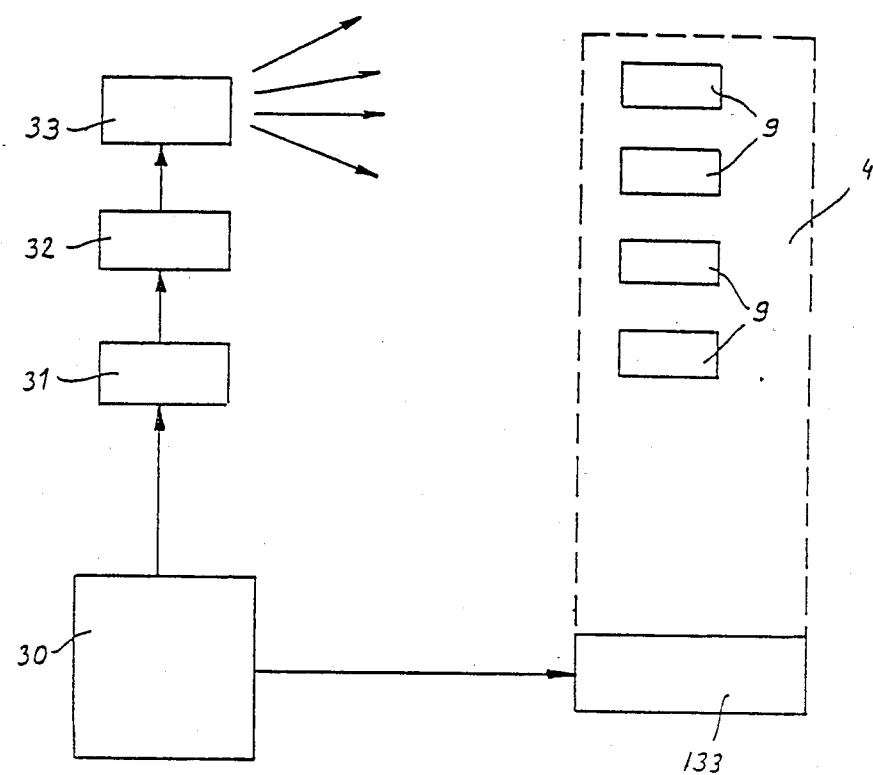
FIG. 3 diagramatically shows the control for the selection of the containers.

FIG. 3 shows the basic construction of the control. From the input and processing unit 30 the signal containing the code of the desired container 9 is fed to a modulator 31 which modulates the signal onto a carrier wave, pulse-code modulation or frequency modulation being, for instance, very suitable methods of modulation. This modulated signal is then amplified in the transmitter 32 and sent out over the antenna 33 constituting a radiation means for radiating the signal.

This signal which is sent into the storage area is received and evaluated by the containers 9 receiving and code recognition devices 19 of the containers 9.

At that container 9 whose code corresponds to the code of the signal received, the release device is activated and the container slides from the resting surface 3 onto the conveyor belt 5, which possibly rotates continuously. Of course, it is also possible to start the conveyor belts 5 only at the time that a signal is given off by the input and processing device 20 or only when a container 9 comes onto them.

In the embodiment shown, the transport means, such as the conveyor belts 5 and the vertical conveyor 10, are started by a signal given by the input and processing unit 30 to a transport control unit 133 which controls them.

Figure 4:
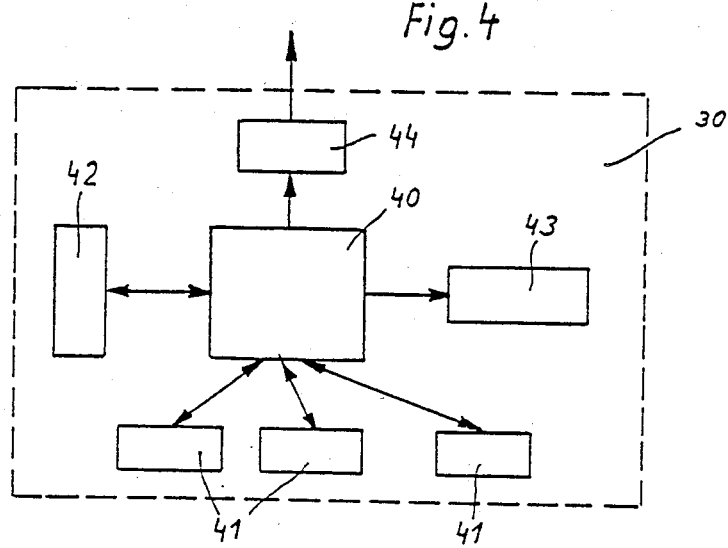
FIG. 4 diagramatically shows the construction of an input and processing device.

The input and processing unit 30 may suitably consist, as shown in FIG. 4, of a plurality of input stations 41 connected to a computer 40. Furthermore, a data storage 42 and a printer 43 are connected to the computer 40.

In this way it is possible, via the input stations, to input the number of individual storage articles contained in or to be removed from stock into the computer 40, which determines the actual quantity in stock and enters it in the data storage 42 or prints it out via the printer 43. At the same time, the computer 40 sends to an interface circuit 44, the code of that container 9 in which 231 corresponding stock article is stored. The signal containing the corresponding code then passes from the interface circuit 44 to the modulator 31.

Figure 5:
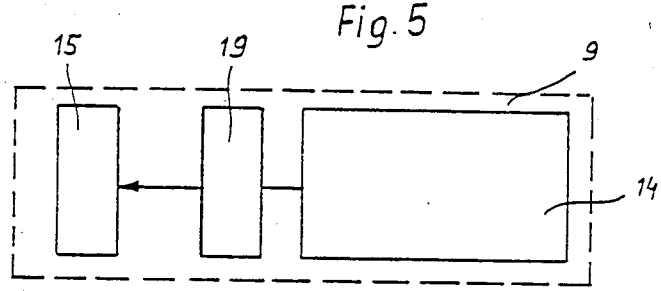
FIG. 5 diagrammatically shows the construction of a container for a storage device according to the invention.

As shown diagramatically in FIG. 5, the containers 9 have a filling space 14 and a compartment, separate therefrom, in which the receiving and code recognition device 19 and the release device 15 controlled thereby are arranged.

The receiving and code recognition device 19 include, as can be noted from FIG. 6, the antenna (radiation receiver) 50 from which the modulated signal received passes to the receiver circuit 51, where it is amplified. Behind this receiver circuit 51 there is a demodulator 52. The demodulated signal passes to an evaluation and decision logic 53 which has a storage for the code specific to the container 9 and a comparison circuit which compares the code of the signal which has arrived with the code stored.

Figure 7:
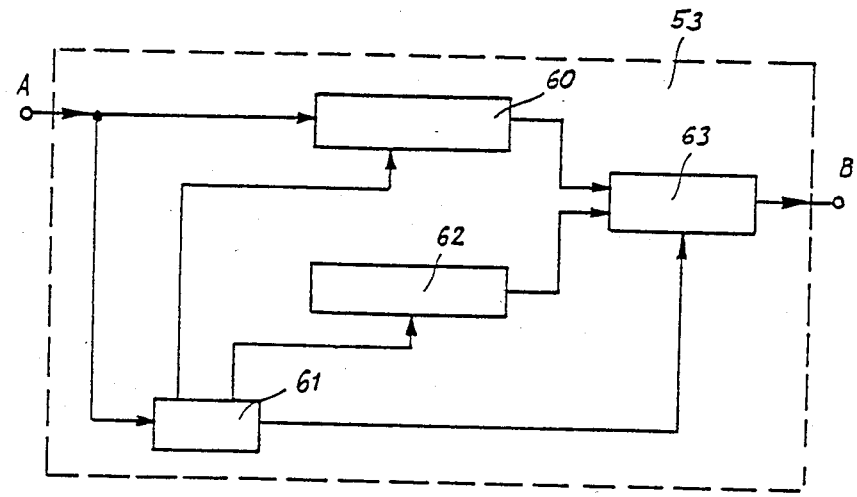
FIG. 7 shows circuitry for comparing an incoming command signal with a set of stored signals.
Figure 8:
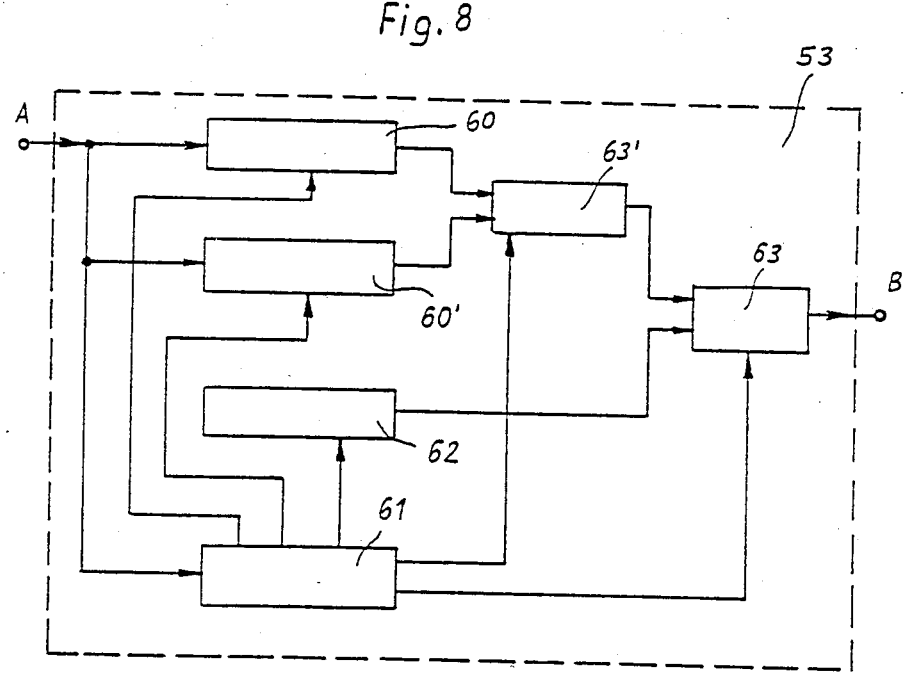
FIG. 8 shows a further embodiment of the circuitry of FIG. 7 provided with noise immunity.

Examples for the possible construction of a suitable evaluation and decision logic 53 are shown in FIGS. 7 and 8.

In the embodiment shown in FIG. 7, the demodulated signal which arrives at the input A is fed to a write-read storage 60, which can be formed for instance of a shift register, and to a program control 61, which in its turn is connected to the write-read storage 60, to a storage 62 in which the code associated with the container in question is stored, and to the comparison circuit 63.

The incoming signal is stored in the write-read storage 60. Thereupon the program control 61 actuates the write-read storage 60 and the storage 62, so that the first element in each case of the recorded codes is fed to the comparison circuit 63. If these elements are identical, the program control 61 acuates the storages 60, 62 again in order to give off the second elements of the stored codes.

If no identity is found upon a comparison, then the program control 61 interrupts the further comparison, erases the write-read storage 60, and resets the storage 62.

If all elements of the codes stored in the storages 60 and 62 are identical, then the comparison circuit 63 gives off, at its output B, a signal which activates the release device 15.

The evaluation and decision logic of FIG. 8 is characterized by increased reliability against the influence of noise signals.

It has a construction similar to the evaluation and decision logic of FIG. 7, but an additional write-read storage 60' and an additional comparison circuit 63' are provided. They are also controlled by the program control 61.

Another difference is that the input and code-producing unit 30, in order to call for a given container 9, does not merely give off a signal corresponding to its code but repeats this signal after a short pause.

These signals, which enter via the demodulator 52, pass to the evaluation and decision logic, the first signal to arrive being stored in the write-read storage 60. The subsequently arriving signal is stored in the write-read storage 60' by the program control 61. These stored signals are compared, element by element, in the comparison circuit 63' and stored in an internal temporary storage of this comparison circuit 63' only in case of identity. If there is no identity, then the program control 61 erases the storage contents of the storages 60, 60' and of the temporary storage of the comparison circuit 63'.

If the signals stored in the write-read storages 60, 60' are identical, so that influence by noise signals can be excluded, the elements of the code signal which are stored in the internal temporary storage of the comparison circuit 63' are compared, element by element, in the comparison circuit 63 with the code stored in the storage 62 and, in case of identity, give off a signal which activates the release device 15.

If identity is not present, then the program control erases the content of the write-read storages 60, 60' and resets the comparison circuits 63, 63' as well as the storage 62.

Figure 9:
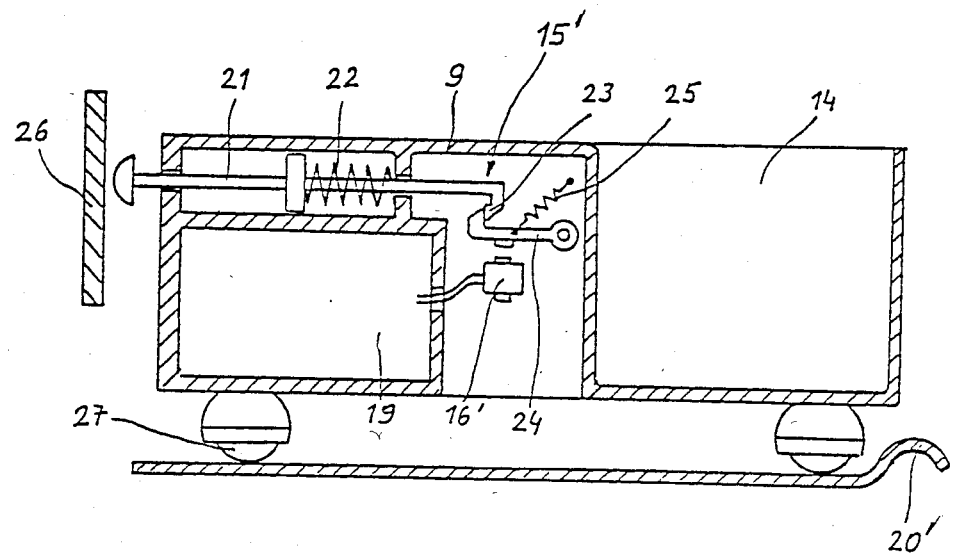
FIG. 9 shows another embodiment of a container.

In the embodiment shown in FIG. 9, the hold-back device is formed by a bead 20' arranged on the front edge of the horizontal resting surface 3. The release device 15 consists in this case of the ram 21, which is acted on by the spring 22. The ram 21, furthermore, has a nose 23 behind which a pawl 24 engages in the tensioned condition of the spring, as can be noted from FIG. 9, the pawl being held in engagement with the nose 23 by a spring 25 and being mounted swingably in the container 9. The pawl 24 can be brought out of this engaged position by energization the electromagnet 16', which is controlled by the receiving and code recognition device 19.

If the electromagnet 16 is energized, the pawl 24 is withdrawn and the ram 21 released. The latter strikes against an impact wall 26 arranged in the region of the rear edge of the resting surface 3 and thus pushes forward the container 9 which is supported on ball casters 27. The container 9 thus slides over the bead 20' and passes to a conveyor device which brings it to a delivery station.

Figure 10:
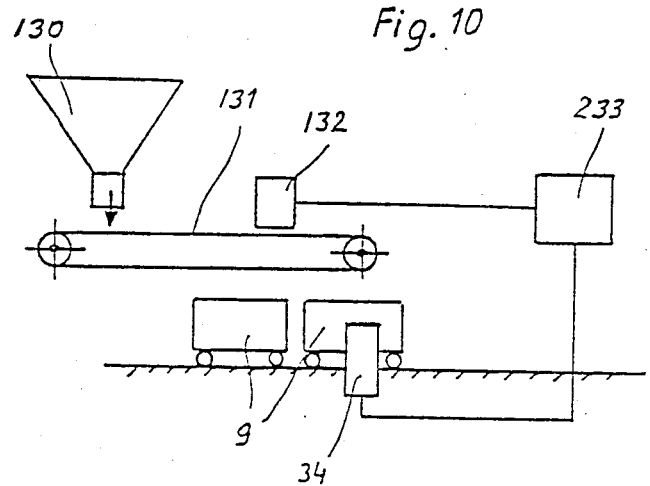
FIG. 10 diagrammatically shows a device for filling the containers.

FIG. 10 shows diagrammatically an automatic filling device for the containers of the invention. The articles to be stored, which have been provided with a code, are emptied into the filling hopper 130 and pass from there onto a conveyor 131, being thus brought to a container 9. In this connection they are moved past a code recognition device 132 which feeds the signal corresponding to the code detected to a computer 233.

The containers 9, upon their transport to the filling station, are also movd past a code recognition device 34 which is also connected to the computer 233. In this way, the latter can determine and store the content of each container 9. The filled containers 9 then pass to another conveyor device which can bring them onto the resting surfaces 3 of a receiving frame and which can be developed, for instance, in the manner which has been described in connection with FIGS. 1 and 2.

I claim:

1. A storage device having containers for a plurality of different articles to be stored, each of which containers can be filled with one or a small number of different articles to be stored, the containers being held displaceably in a receiving frame and on a resting surface of the storage device, the storage device including at least one disengageable hold-back device, and the containers being urged in an ejection direction and being held on the resting surface by means of said at least one disengageable hold-back device; the improvement wherein
    each of said containers is held individually in the receiving frame by said hold-back device, said storage device including a release device for disengaging said hold-back device, the ejection direction of each container being perpendicularly to a lengthwise direction of the resting surface which surface receives the containers one alongside the other; and wherein a given code is associated with each container; and wherein
    each container comprises a radiation receiver including a receiving and code recognition device, and a release device connected behind the latter; and wherein
    upon arrival of the signals corresponding to a code associated with a container, said code recognition device activates said release device of the hold-back device which is holding a corresponding container; and wherein
    said storage device further comprising radiating means for radiating the signals each of which corresponds to the code of one container, a signal processing unit which includes a computer having connections to input stations, a data storage, and a printer, radiation of said radiating means being controlled by said processing unit.

2. A storage device according to claim 1, wherein
    the hold-back device is formed of a hook which engages behind one edge of the receiving frame when the container is pushed completely into the receiving frame, said release device including an electromagnet and a spring, the hook being connected with the armature of said electromagnet and being urged by the spring towards a stop position.

3. A storage device according to claim 1 further comprising
    conveyor belts, at least one vertical conveyor and pushing devices; and including
    a plurality of said resting surface inclined to the horizontal for the containers, said conveyor belts being disposed in front of lower edges of each of said resting surfaces respectively, said at least one vertical conveyor being positioned to the side of the resting surfaces and the conveyor belts, and wherein said pushing devices push the containers from the vertical conveyor onto respective ones of the resting surfaces, said storage device including a further conveyor with fingers means extending therefrom to engage with containers for pushing them together along the resting surfaces.

4. A storage device according to claim 3 wherein
    said further conveyor is located in the vicinity of each said resting surface, which conveyor device extends along substantially the entire length of the resting surface and acts upon a container present on the resting surface.

5. A storage device according to claim 1 wherein
    said hold-back device is formed by bead which extends along the front edge of the resting surface, and the release device comprises a ram and a spring acting upon the ram, said release device having a pawl enabling the ram to be held in its tensioned position by the pawl and an electromagnet means for unlocking the release device, an impact wall being located in the region of the rear edge of the resting surface.

6. A storage device according to claim 5, characterized by the fact that the containers (9) are supported on ball casters (27).

7. A storage device according to claim 1, further comprising
    conveyor belts, at least one vertical conveyor and pushing devices; and including
    a plurality of said resting surface inclined to the horizontal for the containers, said conveyor belts being disposed in front of lower edges of each of said resting surfaces respectively said at least one vertical conveyor being positioned to the side of the resting surfaces and the conveyor belts, and wherein said pushing devices push the containers from the vertical conveyor onto respective ones of the resting surfaces.

8. A storage device according to claim 2, further comprising
    conveyor belts, at least one vertical conveyor and pushing devices; and including a plurality of said resting surfaces inclined to the horizontal for the containers, said conveyor belts being disposed in front of lower edges of each of said resting surfaces respectively, said at least one vertical conveyor being positioned to the side of the resting surfaces and the conveyor belts, and wherein said pushing devices push the containers from the vertical conveyor onto respective ones of the resting surfaces.

* * * * *